US009656735B2

United States Patent
Wittmaak, Jr. et al.

(10) Patent No.: US 9,656,735 B2
(45) Date of Patent: May 23, 2017

(54) SKIN IMPACT SNUBBER

(71) Applicant: Bell Helicopter Textron Inc., Fort Worth, TX (US)

(72) Inventors: John R. Wittmaak, Jr., Newark, TX (US); Philip J. Hannan, Weatherford, TX (US); Maxx S. Lucas, Johnson City, NY (US); Chandrashekhar Tiwari, Irving, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 178 days.

(21) Appl. No.: 14/293,250

(22) Filed: Jun. 2, 2014

(65) Prior Publication Data

US 2016/0185436 A1    Jun. 30, 2016

Related U.S. Application Data

(60) Provisional application No. 61/949,010, filed on Mar. 6, 2014.

(51) Int. Cl.
| | |
|---|---|
| *B64C 1/06* | (2006.01) |
| *B64C 27/04* | (2006.01) |
| *B64C 27/00* | (2006.01) |
| *B64D 45/00* | (2006.01) |

(52) U.S. Cl.
CPC .............. *B64C 1/06* (2013.01); *B64C 27/006* (2013.01); *B64C 27/04* (2013.01); *B64D 45/00* (2013.01); *B64D 2045/0095* (2013.01)

(58) Field of Classification Search
CPC .. B64C 1/061; B64C 1/18; B64C 1/12; B64C 1/064; B64C 1/00
See application file for complete search history.

(56) References Cited

U.S. PATENT DOCUMENTS

| | | | |
|---|---|---|---|
| 8,376,275 B2 * | 2/2013 | Bolukbasi | B64C 1/062 244/119 |
| 8,702,036 B2 * | 4/2014 | Curry | B64C 1/20 244/118.1 |
| 2009/0236472 A1 * | 9/2009 | Wood | B64C 1/18 244/119 |
| 2009/0294588 A1 * | 12/2009 | Griess | B64C 1/068 244/121 |
| 2010/0243803 A1 * | 9/2010 | Westre | B64C 1/18 244/119 |
| 2013/0009008 A1 * | 1/2013 | Westphal | B64C 1/061 244/119 |
| 2015/0274303 A1 * | 10/2015 | Gray | B64D 13/02 454/71 |

\* cited by examiner

*Primary Examiner* — Valentina Xavier

(57) ABSTRACT

In some embodiments, an aircraft includes a structural assembly, a skin, and a snubber. The structural assembly comprises a first rigid element and a second rigid element. The first and second rigid elements are separated from each over by a void. The skin is disposed proximate to the structural assembly and adjacent to the void such that the skin would deflect into the void in response to an impact force received by the skin. The snubber is disposed in the void between the first and second rigid elements and positioned such that, when the skin deflects in response to the impact force, the skin contacts the snubber and the snubber reduces further deflection of the skin into the void.

20 Claims, 2 Drawing Sheets

SKIN IMPACT SNUBBER

RELATED APPLICATIONS

Pursuant to 35 U.S.C. §119 (e), this application claims priority to U.S. Provisional Patent Application Ser. No. 61/949,010, SKIN IMPACT SNUBBER, filed Mar. 6, 2014. U.S. Provisional Patent Application Ser. No. 61/949,010 is hereby incorporated by reference.

TECHNICAL FIELD

This invention relates generally to aerospace structures, and more particularly, to a skin impact snubber.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
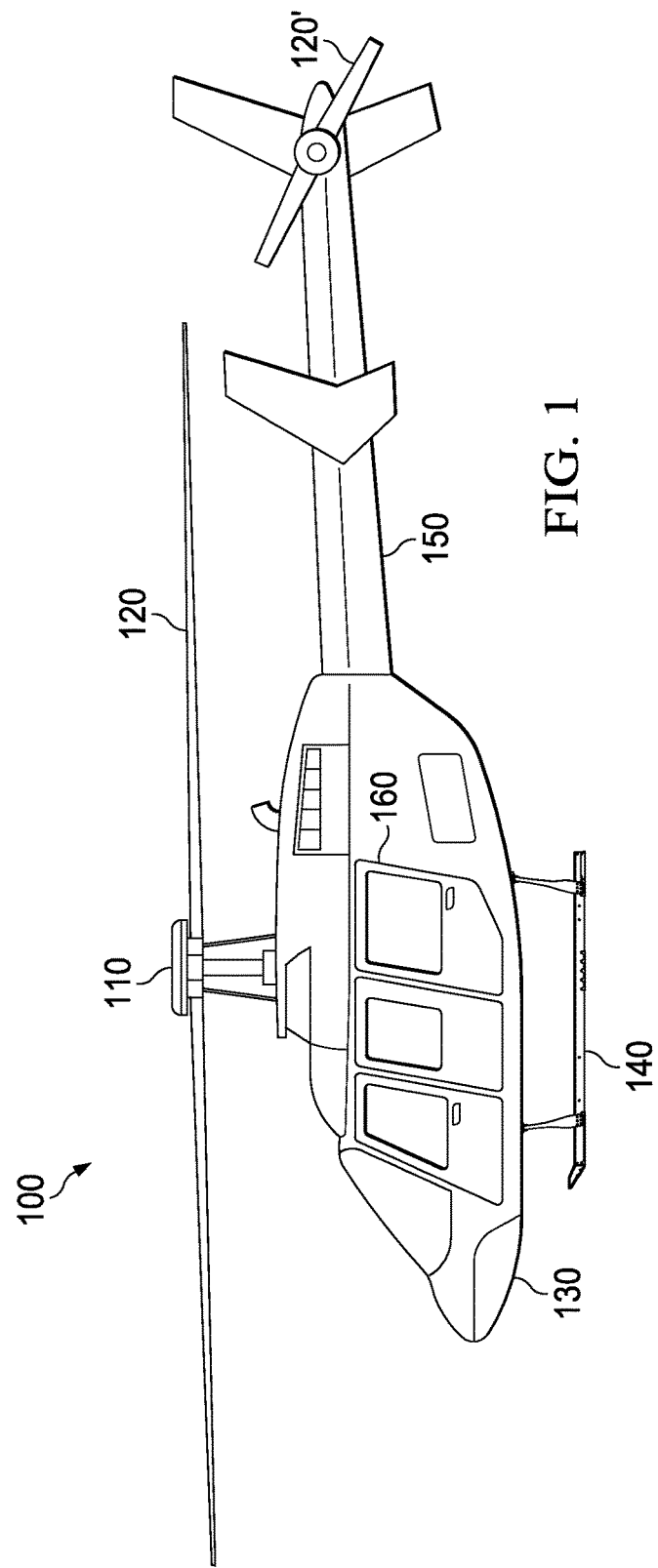
FIG. 1 shows a rotorcraft according to one example embodiment.

FIG. 1 shows a rotorcraft 100 according to one example embodiment. In the example of FIG. 1, rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments recognize that blades 120' may represent one example of a secondary rotor system; other examples may include, but are not limited to, forward-thrust propellers (e.g., pusher propellers, tractor propellers, etc.), tail anti-torque propellers, ducted rotors, and ducted fans mounted inside and/or outside the rotorcraft.

Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIG. 1. For example, rotor system 110 may include components such as a power train, drive shafts, a hub, a swashplate, and pitch links.

Fuselage 130 may be made of a variety of one or more different constituent pieces and materials. For example, fuselage 130 may include structural members and "skin" material attached to the structural members. Fuselage 130 may also include movable components, such as door 160. In the example of FIG. 1, door 160 is a sliding side door. In this example, rotorcraft 100 may also feature a door-sliding system configured to slide door 160 from an open position to a closed position.

During operation of rotorcraft 100, door 160 may be subject to various forces and impacts. One common example is a bird strike. A bird strike may occur when rotorcraft 100 collides with a bird during flight. A bird strike against the skin of fuselage 130 may cause the skin to deflect. For example, in some scenarios, a bird strike against the skin of fuselage 130 may cause skin deflection similar to a wave as the mass (the bird) travels along the skin. This skin could fail, however, if the skin deflects too far or too quickly. For example, failure may occur if a deflection wave approaches a seam between skin panels. Accordingly, teachings of certain embodiments recognize the ability to prevent skin failures by limiting skin deflection.

If weight, size, and money were not issues, one could limit skin deflections by adding strength to the skin and adding support beams to reinforce the skin. But weight, size, and money are important, especially in the aviation industry. For example, stiffening an aircraft skin may increase stress levels in other areas, and these other areas may then also require strengthening (which may require additional weight). As another example, adding weight to a door skin to limit skin deflections adds extra loads to the door hinges, which requires heavier, larger, and/or more expensive door hinges. Accordingly, teachings of certain embodiments recognize the capability to limit skin deflections with minimal cost.

Figure 2:
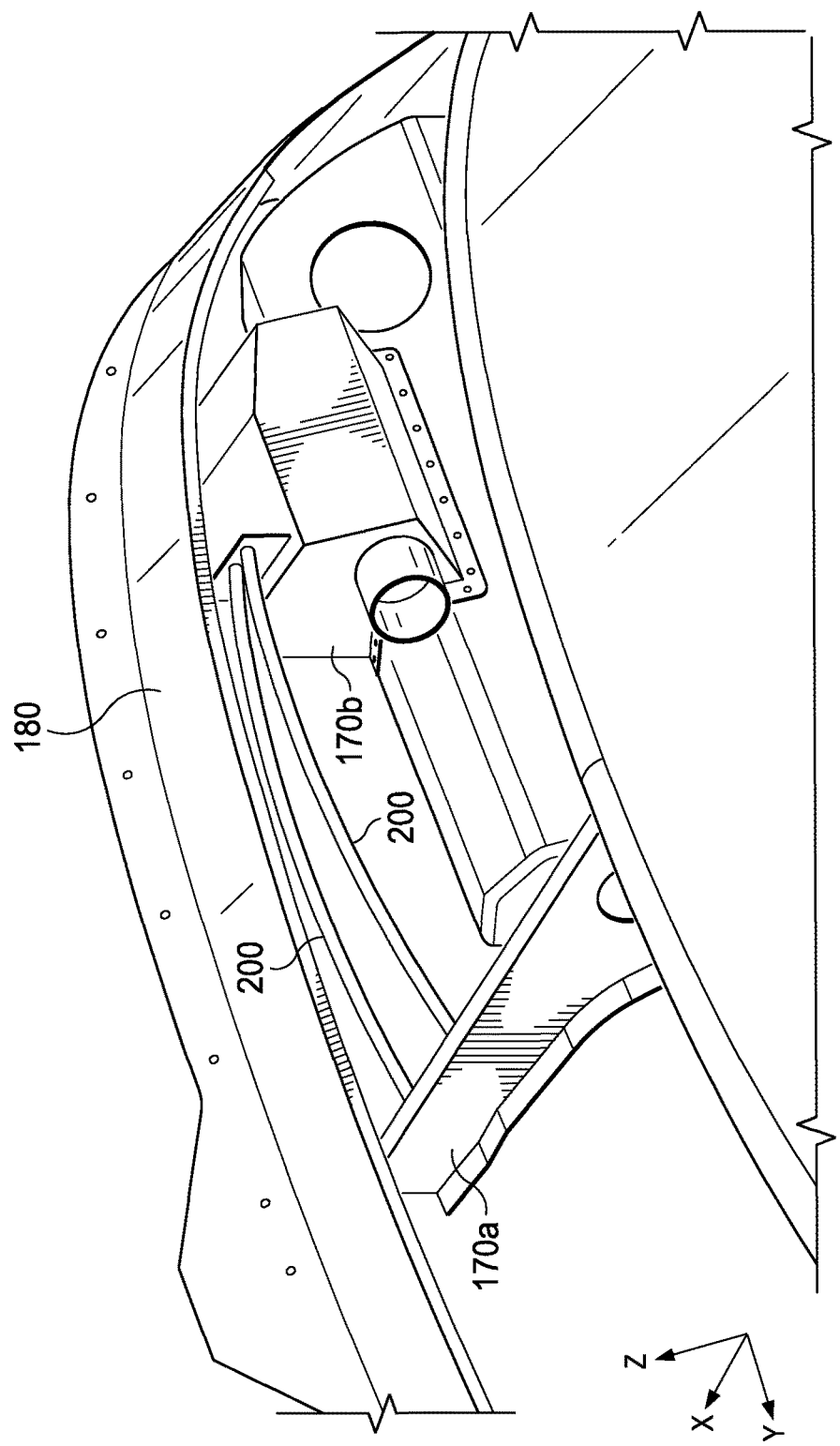
FIG. 2 shows a skin impact snubber of the rotorcraft of FIG. 1 according to one example embodiment.

FIG. 2 shows an interior view of a portion of rotorcraft 100 featuring skin impact snubbers 200 according to one example embodiment. In operation, according to one example embodiment, snubbers 200 limit the deflection of the fuselage skin (not shown) in response to an external force (such as a bird strike).

In the example of FIG. 2, skin impact snubbers 200 extend between two structures 170a and 170b within fuselage 130. In this example, structures 170a and 170b represent preexisting structure that is provided in the aircraft for a reason other than supporting skin impact snubbers 200. In the example shown in FIG. 2, the primary purpose of structure 170a is to provide rigid support to fuselage 130, and the primary purpose of structure 170b is to provide a protective housing to one or more components within fuselage 130. Teachings of certain embodiments recognize that supporting skin impact snubbers 200 using preexisting structures results in a lower overall weight than using dedicated support structures for skin impact snubbers 200.

In the example of FIG. 2, skin impact snubbers 200 are located near the fuselage skin but are not in physical contact with the fuselage skin. In this example, seam 180 represents a seam between two adjacent panels of fuselage skin. Teachings of certain embodiments recognize that providing skin impact snubbers 200 near the fuselage skin but not in ordinary contact with the fuselage skin may reduce costs by reducing the potential for rubbing between the snubbers and the skin and by eliminating the need to design special interfaces between the snubbers and the skin.

Although skin impact snubbers 200 may not be in direct physical contact with the fuselage skin during normal operation of rotorcraft 100, fuselage skin may deflect and come into contact with the skin impact snubbers 200 in response to an outside force (such as a bird strike). In the example of FIG. 2, skin impact snubbers 200 are located in a deflection path of the fuselage skin. A deflection path is the path that fuselage skin follows when deflecting in response to an outside force. In the example of FIG. 2, skin impact snubbers 200 are located in a portion of the deflection path that would normally be void. Thus, without the presence of the skin impact snubbers 200, the fuselage skin would normally deflect along the deflection path unencumbered, thus resulting in potentially higher damage to the fuselage skin. Skin impact snubbers 200, however, may limit skin deflection by contacting the fuselage skin at a point along the deflection path and reducing and/or preventing further deflection.

Skin impact snubbers 200 may be provided in a variety of shapes and sizes. For example, snubbers 200 may be provided in an appropriate number and spacing based on expected forces due to various skin impacts (e.g., bird strikes). In the example of FIG. 2, snubbers 200 are provided with an arched shape so as to provide additional strength when a mass forces the fuselage skin to deflect into the snubbers 200.

In some embodiments, skin impact snubbers 200 may be configured to be easily removable. For example, skin impact snubbers 200 may be designed to fit in place (e.g., the arched shape allows the skin impact snubbers to spring into place) or to be held in place using pins or other devices. Teachings of certain embodiments recognize that providing removable skin impact snubbers may allow the skin impact snubbers to act as sacrificial members, designed to be removed and replaced following a bird strike or other impact. In this manner, sacrificing a skin impact snubber may cost less than replacing the actual fuselage skin. In addition, teachings of certain embodiments recognize that providing removable skin impact snubbers may improve access within fuselage 130 during maintenance or inspection procedures. Furthermore, teachings of certain embodiments recognize that providing removable skin impact snubbers may allow for quick and small impact redesigns during bird strike testing.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An aircraft comprising:
   a structural assembly comprising a first rigid element and a second rigid element, the first and second rigid elements separated from each other longitudinally by a void;
   a skin disposed proximate to the structural assembly and adjacent to the void such that the skin would deflect inward into the void in response to an impact force received by the skin; and
   a snubber disposed in the void and extending longitudinally between the first and second rigid elements and positioned such that, when the skin deflects inwardly in response to the impact force, the skin contacts the snubber and the snubber reduces further deflection of the skin into the void;
   wherein prior to the impact force, the first rigid element is not between the second rigid element and the skin and the second rigid element is not between the first rigid element and the skin.

2. The aircraft of claim 1, wherein:
   the skin would deflect into the void along a deflection path in response to the impact force received by the skin; and
   the snubber is positioned such that, when the skin deflects in response to the impact force, the skin contacts the snubber at a point along the deflection path and the snubber reduces further deflection of the skin into the void.

3. The aircraft of claim 2, wherein the skin contacts the snubber at the point along the deflection path such that, if the snubber was not disposed in the void, the skin would deflect along the deflection path unencumbered past the point in response to the impact force.

4. The aircraft of claim 1, wherein the first rigid element comprises a spar configured to provide rigid support to an aircraft fuselage.

5. The aircraft of claim 1, wherein the second rigid element comprises a protective housing disposed within an aircraft fuselage.

6. The aircraft of claim 1, wherein the skin is in contact with the first and second rigid elements.

7. The aircraft of claim 1, wherein the skin and the snubber are situated such that they are not in contact other than when the skin deflects in response to the impact force.

8. The aircraft of claim 1, wherein the snubber is coupled to the first rigid element and the second rigid element.

9. The aircraft of claim 8, wherein the snubber is removably coupled to the first rigid element and the second rigid element.

10. The aircraft of claim 1, wherein the aircraft is a rotorcraft comprising:
    a body, the body comprising the structural assembly, the skin, and the snubber;
    a power train coupled to the body and comprising an engine and a drive shaft coupled to the engine; and
    a rotor system coupled to the power train, the rotor system comprising at least one rotor blade.

11. A method of reducing damage to a skin of an aircraft caused by an impact force, the aircraft comprising a structural assembly comprising a first rigid element and a second rigid element, the first and second rigid elements longitudinally separated from each other by a void, the skin being disposed proximate to the structural assembly and adjacent to the void such that the skin would deflect inward into the void in response to an impact force received by the skin, the method comprising:

receiving, by the skin, the impact force; and providing a snubber in the void between the first and second rigid elements and such that, when the skin deflects inwardly in response to the impact force, the skin contacts the snubber and the snubber reduces further deflection of the skin into the void;

wherein prior to the skin receiving the impact force, the first rigid element is not between the second rigid element and the skin and the second rigid element is not between the first rigid element and the skin.

12. The method of claim 11, wherein:

the skin would deflect into the void along a deflection path in response to the impact force received by the skin; and providing the snubber in the void between the first and second rigid element comprises providing the snubber such that, when the skin deflects in response to the impact force, the skin contacts the snubber at a point along the deflection path and the snubber reduces further deflection of the skin into the void.

13. The method of claim 12, wherein the skin contacts the snubber at the point along the deflection path such that, if the snubber was not disposed in the void, the skin would deflect along the deflection path unencumbered past the point in response to the impact force.

14. The method of claim 11, wherein the first rigid element comprises a spar configured to provide rigid support to an aircraft fuselage.

15. The method of claim 11, wherein the second rigid element comprises a protective housing disposed within an aircraft fuselage.

16. The method of claim 11, wherein the skin is in contact with the first and second rigid elements.

17. The method of claim 11, wherein the skin and the snubber are situated such that they are not in contact other than when the skin deflects in response to the impact force.

18. The method of claim 11, wherein the snubber is coupled to the first rigid element and the second rigid element.

19. The method of claim 18, wherein the snubber is removably coupled to the first rigid element and the second rigid element.

20. The method of claim 1, wherein the aircraft is a rotorcraft comprising:

a body, the body comprising the structural assembly, the skin, and the snubber;

a power train coupled to the body and comprising an engine and a drive shaft coupled to the engine; and a rotor system coupled to the power train, the rotor system comprising at least one rotor blade.

* * * * *